(12) United States Patent
Rendic (10) Patent No.: US 7,132,763 B2
(45) Date of Patent: *Nov. 7, 2006

(54) SYSTEM AND METHOD FOR AUTOMATICALLY INTERRUPTING POWER TO A SECONDARY DEVICE UPON THE EXTINGUISHING OF POWER TO A PRIMARY DEVICE

(76) Inventor: Neven V. Rendic, Cuarto Centenario 446, Departamento 24, Santiago, Chile (CL)

( * ) Notice: Subject to any disclaimer, the term of this patent is extended or adjusted under 35 U.S.C. 154(b) by 306 days.

This patent is subject to a terminal disclaimer.

(21) Appl. No.: 10/794,367

(22) Filed: Mar. 5, 2004

(65) Prior Publication Data

US 2004/0169420 A1 Sep. 2, 2004

Related U.S. Application Data

(63) Continuation of application No. 10/005,887, filed on Dec. 3, 2001, now Pat. No. 6,744,150.

(51) Int. Cl.
*H02J 1/00* (2006.01)
(52) U.S. Cl. .................................... 307/31
(58) Field of Classification Search ............ 307/38, 307/126, 112, 31
See application file for complete search history.

(56) References Cited

U.S. PATENT DOCUMENTS 2,979,624 A 4/1961 Askerneese

| | | |
|---|---|---|
| 4,395,640 A | 7/1983 | Bone |
| 5,347,167 A | 9/1994 | Singh |
| 5,359,540 A | 10/1994 | Ortiz |
| 5,424,903 A | 6/1995 | Schreiber |
| 5,506,790 A | 4/1996 | Nguyen |
| 5,579,201 A | 11/1996 | Karageozian |
| 5,731,947 A | 3/1998 | Hirose |
| 5,904,591 A | 5/1999 | Shiau |
| 6,211,581 B1 | 4/2001 | Farrant |
| 6,501,195 B1 | 12/2002 | Barton |
| 6,509,655 B1 * | 1/2003 | Wang .................... 307/31 |

* cited by examiner

*Primary Examiner*—Robert L. Deberadinis
(74) *Attorney, Agent, or Firm*—Kevin P. Crosby; Daniel C. Crilly; Brinkley, Morgan et al.

(57) ABSTRACT

The present invention encompasses a system and method for automatically interrupting a flow of power from an external electrical energy source to at least one device upon the extinguishing of power to another device. The system includes a power strip, a voltage sensing device (e.g., a 5 Volt power tap), and a switch. The power strip has at least one switched outlet adapted to receive an electrical power cord plug from at least one secondary or peripheral device. The voltage sensing device selectively detects an operating voltage of a primary device, wherein the operating voltage is less than a voltage associated with power supplied by the energy source. The switch is coupled to the voltage sensing device and selectively supplies electrical energy from the energy source to the switched outlet(s) depending upon whether or not the voltage sensing device detects the operating voltage of the primary device.

23 Claims, 7 Drawing Sheets

SYSTEM AND METHOD FOR AUTOMATICALLY INTERRUPTING POWER TO A SECONDARY DEVICE UPON THE EXTINGUISHING OF POWER TO A PRIMARY DEVICE

CROSS-REFERENCE TO RELATED APPLICATIONS

This application is a continuation of U.S. application Ser. No. 10/005,887, filed Dec. 3, 2001, now U.S. Pat. No. 6,744,150, and hereby claims priority upon such application under 35 U.S.C. § 120.

BACKGROUND OF THE INVENTION

1. Field of the Invention

The present invention relates generally to electrical power delivery devices, and, more particularly, to an electrical extension cord with electrical outlets (commonly referred to as a "power strip") controlled by a personal computer (PC) for providing and interrupting power to peripheral equipment.

One type of electrical extension cord, commonly known as a power strip, generally comprises an elongate box-like housing having a row of plug-receiving receptacles formed therein, an on/off switch, and a single power cord which is connectable to a standard AC nominal 110 volt (foreign 220 volts) wall or other outlet. The power cord is typically plugged into the power outlet to energize the power strip. Thereafter, a plurality of devices may be plugged into the various plug receiving receptacles of the power strip. When the on/off switch of the power strip is turned to its "ON" position, current will flow to the plug-receiving receptacles and any devices which are plugged into the receptacles will become energized. Conversely, when the on/off switch is placed in its "OFF" position, devices which are plugged into the electrical power strip will become de-energized. Some of the currently available electrical power strips include resettable circuit breakers and generally include circuitry involving power surge suppression and noise filtration, to protect the personal computer from power surges, noise that comes from standard AC power, and power outages or blackouts. Some power controllers also include backup power supply in the form of a battery that can sustain the computer if a power outage or blackout occurs. These conventional power controller devices function to transmit power to a computer and peripheral devices, but generally fail to affect any operative functions of the computer or its peripheral devices.

Other power controllers are generally confined to outlet strips that enable a computer and several peripheral devices to be connected to the power strip, which is connected directly to a standard AC wall outlet. In computer systems, there is a problem of how to conveniently turn on the CPU and peripherals from the desktop. This problem is commonly handled by the use of a manually operated master switch on a conventional multi-outlet power strip or under monitor power centers. This approach however requires that the power strip be located next to the computer or under the monitor, something that is often undesirable. Another approach is to use a power strip, which is remotely controlled by a smaller switching unit, located at the desktop. This still suffers from the problem of requiring an additional piece of equipment on the desk. Power supply units in older PC's, such as the model XT and AT, provided only one such controlled outlet for the connection of a monitor. When several peripheral devices were connected to a computer system, an extension line was needed to provide peripheral equipment with AC power supply. However, because the extension line was not connected in series to the power outlet of the power supply unit of the computer system, the installed peripheral equipment had to be turned off separately when the computer system was turned off. If the computer user forgot to turn off the peripheral equipment, the peripheral equipment remained ON and consuming and wasting electrical power.

When using modern computers it is desirable and customary to cause a plurality of peripheral equipment to become energized and de-energized concurrently with the CPU. For example, when using a computer, it is sometimes desirable to energize/de-energize a group of secondary or peripheral devices concurrently with the computer. Examples of such secondary devices, which may be powered externally of the computer, include monitor, printer, plotter, scanner, sub woofer and speakers, etc.

However, it is unduly laborious to have to turn each of the secondary or peripheral devices on and off independently, rather than utilizing the single on/off switch of the power strip to effect simultaneous energization and de-energization of the secondary devices. And, the under-monitor control center is obsolete because it does not support the automatic software turnoff feature common in today's software products as will be described below.

2. Description of the Prior Art

In order to provide background information so that the invention may be completely understood and appreciated in its proper context, reference may be made to a number of prior U.S. patents as follows:

| | | |
|---|---|---|
| 4,204,249 | 4,675,537 | 5,506,790 |
| 4,312,035 | 4,685,023 | 5,731,947 |
| 4,368,394 | 4,747,041 | 5,904,591 |
| 4,484,258 | 4,794,525 | 6,211,581 |
| 4,463,967 | 5,250,851 | |
| 4,395,640 | 5,347,167 | |
| 4,623,967 | 5,359,540 | |
| 4,647,721 | 5,424,903 | |

U.S. Pat. No. 4,395,640 to Bone, issued Jul. 26, 1983, discloses a "special electric convenience outlet." Specifically, the invention discloses a home convenience electrical outlet unit which includes the particular combination of both normally energized outlets for powering appliances requiring constant power and switch controlled outlets for selectively energizing appliances. This device incorporates a manually operated switch and is not intended to be used in connection with personal computer equipment.

U.S. Pat. No. 5,250,851 to McKnight, et al., issued Oct. 5, 1993, discloses a "video monitor support and power distribution assembly". This is the well-known under-monitor control center and is not capable of automatic connection or disconnection of power to computer equipment.

U.S. Pat. No. 5,347,167 to Singh, issued Sep. 13, 1994, discloses a "power controller using keyboard and computer interface". This invention is a power control device which incorporates a microcontroller to control the switching of power to and from a plurality of outlets. A host computer communicates with the microcontroller through the computer's keyboard interface to instruct the device to turn on or off one or more of the outlets either immediately or at one or more preset future times. An operator communicates with the microcontroller through the computer's keyboard to intercede to instruct the device to initiate a sequence of pre-programmed on/off events. This invention works only with Apple Computers using the Macintosh operating systems due to its use of ADB (Apple Desktop Bus). This device requires special software known as "PowerKey Pro Software" in order to function.

U.S. Pat. No. 5,359,540 to Ortiz, issued Oct. 25, 1994, discloses a "computer assisted electric power management" system, and describes a complex power control apparatus connected to a parallel port of a computer. This device utilizes apparatus which connects through a computer in which electrical power outlets are independently switched in response to control signals from user switches, the computer, or other devices (telephone ring signal, timer alarm, etc.), and on demand transmits to the computer logic status and hardware interrupt signals. The device requires a "memory resident routine or program to control the on/off state of the electrical power outlets automatically and/or in response to keyboard commands".

U.S. Pat. No. 5,424,903 to Schreiber, issued Jun. 13, 1995, discloses an intelligent power switching system for controlling the electrical connection of a power source to each of a plurality of outputs, such as personal computer components or electronic entertainment equipment. Switch circuitry is coupled to relay circuitry for generating signals responsive to user commands to select an "ON" or "OFF" state with respect to each output. A processor receives switching signals and generates control signals to effect actuation of the relays. Responsive to user programming commands, the processor stores the switching signals, their sequence and the time delay between their generation. Responsive to a subsequent abbreviated user "power-on" command, the processor generates control signals by reading the stored switching signals, their sequence and time delay, and automatically actuates the relays with respect to each output in the same order and with the same time delay as defined by the user programming commands. A "power off" command causes the relays to be actuated in the reverse order. The Schreiber device is a micro-processor controlled sequencer unit with time delayed sequencing. This intelligent power switcher needs very complex hardware and software in order to function and to achieve its goals. It is also a self-operated device without the action of a human being and does neither allows manual operation nor implements the objects of the present invention. The instant invention permits both automatic software shutoff as well as manual shutoff by switching the CPU master on/off switch to the off position.

U.S. Pat. No. 5,506,790 to Nguyen, issued Apr. 9, 1996, discloses a "single-chip microcomputer programmable power distributor", which is an apparatus for controlling an electrical power distributor for a personal computer, its peripherals, and other devices. The apparatus includes a parallel interface, single-chip microcomputer, plurality of relays, power source connector, and plurality of electrical outlets. Communication with the distributor is made by a software program for the personal computer that translates simple commands from the user into commands sent through the parallel port of the personal computer to the distributor. This intelligent power switcher needs very complex hardware and software in order to function and to achieve it goals.

U.S. Pat. No. 5,579,201 to Karageozian, issued Nov. 26, 1996, discloses an electrical power strip device for energizing and de-energizing at least one secondary device substantially simultaneously with the energization and de-energization of a primary device of the type having a power supply cord which is connectable to a first electrical power source and a power output jack which becomes energized and de-energized simultaneously with the energization and de-energization of said primary device via its power supply cord. This device uses an electro-mechanical relay which requires significant voltage and current to function. Further, the relay of Karageozian only operates in response to the presence or absence of primary 110 volt AC power in the power supply cord, and does not sense the secondary side of the 110 Volt AC signal.

Further, Karageozian discloses the use of a radio frequency transmitter connected to the power output jack of the primary device to emit a radio signal when the power output jack is energized and a radio frequency receiver connected to the relay switch to receive the radio signal and to close the electromechanical relay switch when a radio signal is received.

U.S. Pat. No. 5,904,591 to Shiau, issued May 18, 1999, discloses a "power connector system for use with a computer system synchronously" describes a power connector system for connection to a monitor outlet of a computer power supply. This is an older version of a power supply unit where the computer system provides a 110V AC outlet for the connection of a monitor and uses a relay connected to this output in order to be synchronized with the master power switch.

Also using any split connectors like the keyboard connector, mouse connector or any connector supplying 3 to 32 volts (Standard PC power supply provides voltages within PC are +5V red or +12V yellow). Our does sense the secondary DC side by means of 5V power tap.

U.S. Pat. No. 5,731,947 to Hirose, issued Mar. 24, 1998, discloses an "electricity tapping apparatus which automatically turns on the slave units by sensing the power status of the master unit", describes a power plug for inserting in a wall outlet and a tapping table consisting of more than one outlet for accepting power plugs of slave units connected by an electric cord, a switch provided in the cord, the switch ON/OFF controlled by a switch control means which detects through a second power plug connected with a service outlet of a master electronic equipment power voltage provided in parallel with power voltage to be supplied to the master electronic equipment, the switch control means controls whether to provide slave units connected with outlets of the tapping table with power supply voltage when the master electronic equipment is energized. This invention is directed to another complicated power strip containing circuitry which will disable certain outlets on the power strip in response to the interruption of power of the main unit.

U.S. Pat. No. 6,211,581 to Farrant, issued Apr. 3, 2001, discloses a "power bar with remote control", describes the Power Bar with Remote Control that allows a user to control from a distance the power of each outlet contained in the attached Power Bar. This device is similar to the under monitor described previously where a human being must operate a master switch other than the master switch on the CPU. A master switch also allows the power to all outlets to be turned on or off in unison. This device, however, requires that equipment have USB Fireware IEEE 1394 protocol dedicated exclusively to the task of controlling the power in order to have integrated dual AC 110V power and is not capable for automatic connection or disconnection of computer equipment. Cannot be used automatically by the computer, but must be human operated.

Whatever the precise merits, features and advantages of the above cited references, none of them achieves or fulfills the purposes of the present invention.

SUMMARY OF THE INVENTION

The present invention relates to an improved electrical power strip which will automatically energize and de-energize one or more devices which are plugged into the strip, upon receiving an electrical signal from the primary device, without the need for manual actuation of a switch on the electrical strip or an under monitor system by the user. This system senses the primary status of the power supply through a standard 5V power tap connector which is plugged in any appropriate socket of any computing system. The output signal triggers a synchronous transfer switch or relay which enables power to peripheral equipment (such as monitor, printer, scanner, sub woofer, modem, etc.), permitting them to be synchronously turned on or off depending on the computer system status (ON or OFF) eliminating the aforesaid (XT/AT power supply) problem.

It is one object of the present invention to provide a power connector system which receives power supply from a wall outlet and provides it to the peripheral equipment being connected to the computer system, so that the peripheral equipment are synchronously turned on when the computer system is turned on, and the peripheral equipment are synchronously turned off when the computer system is turned off.

The invention itself is a power strip comprised of switched and unswitched outlets, a power cord for providing electrical current to the plug receiving outlets and at least one 5V power tap sensing cord with one or a variety of connectors for providing sensing of electrical voltage. The synchronous transfer switch is preferably a Zero Crossing Transfer Switch, an apparatus being communicative with a PC such that, when the PC is energized, the transfer switch will allow current to flow from the 110 V AC input power cord to the plug receiving receptacles. Unswitched outlets pass output power without passing through the transfer switch.

It is another object of the present invention to provide a power connector system having at least one independent power socket which is unswitched (always-on) (e.g., one, two or three) for devices requiring constant power and one or more switched sockets (e.g., 6) to provide power to electrical outlets only when power is supplied to the PC.

Newer PCs with ATX model power supplies have Software Power-Off Control function in Windows 95, 98 and 2000, to automatically turn OFF the CPU. This is accomplished by clicking the START icon in Windows 95, 98 or 2000, then on the task bar selecting the SHUT-DOWN icon to turn off the computer. The message "It is now safe to turn off your computer" is not shown when using this function. This signal is used to turn OFF all peripheral equipment connected to the power strip switched outlets.

Also, the instant inventor contemplates the use of the Modem ring Power On function, because while the PC is in Soft-off/Suspend state, if an external ring-up signal occurs, the system wakes up and the PC and all the peripheral equipment will be turned ON.

These and other objects and features of the invention will be more readily understood from a consideration of the following detailed description, taken with the accompanying drawings, in which corresponding parts are indicated by corresponding numerals.

DETAILED DESCRIPTION OF A PREFERRED EMBODIMENT

Figure 1:
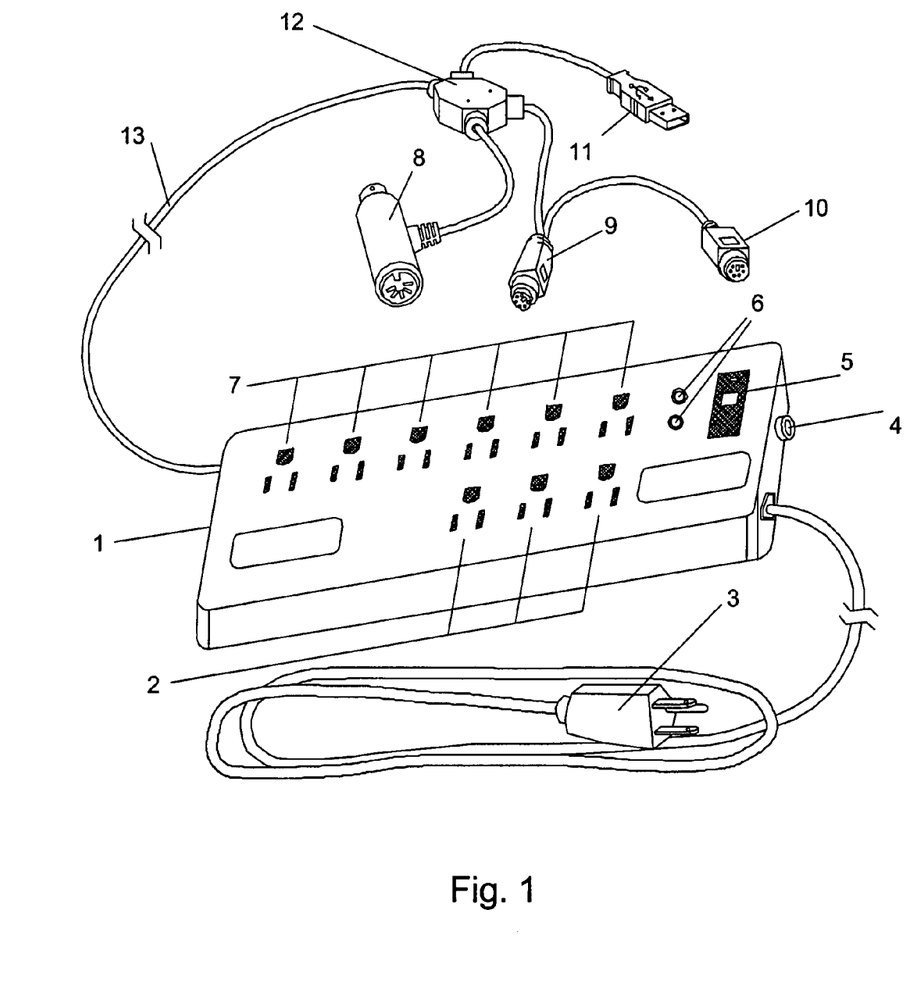
FIG. 1 is a diagramatic representation of an embodiment of my invention.

Referring now to the drawings, FIG. 1 illustrates a generalized embodiment of the invention, in which a power strip has a 1 having a plurality of electrical outlets or sockets 2 and 7, a 110V AC power cord 3, a fuse 4, a circuit breaker and/or master on/off switch 5, and indicator lights 6. The electrical outlets 2 and 7 are used to provide power from a remote source (not shown) through the 110V AC power cord 3 to devices (not shown) which are plugged into any of outlets 2, 7. Switch 5 is preferably employed to interrupt power from power cord 3 to outlets 2 and 7.

A DIN keyboard connector 8 having male and female plugs, a PS/2 male connector mouse/keyboard (mini DIN) plug 9, a PS/2 female connector mouse/keyboard connector (mini DIN) connector 10, and a USB device A type connector 11 are all connected in conductive manner to the interior of housing 1 in a manner to be more fully set forth hereinbelow through a 5 Volt power tap 12 and conductive cable 13.

Figure 2:
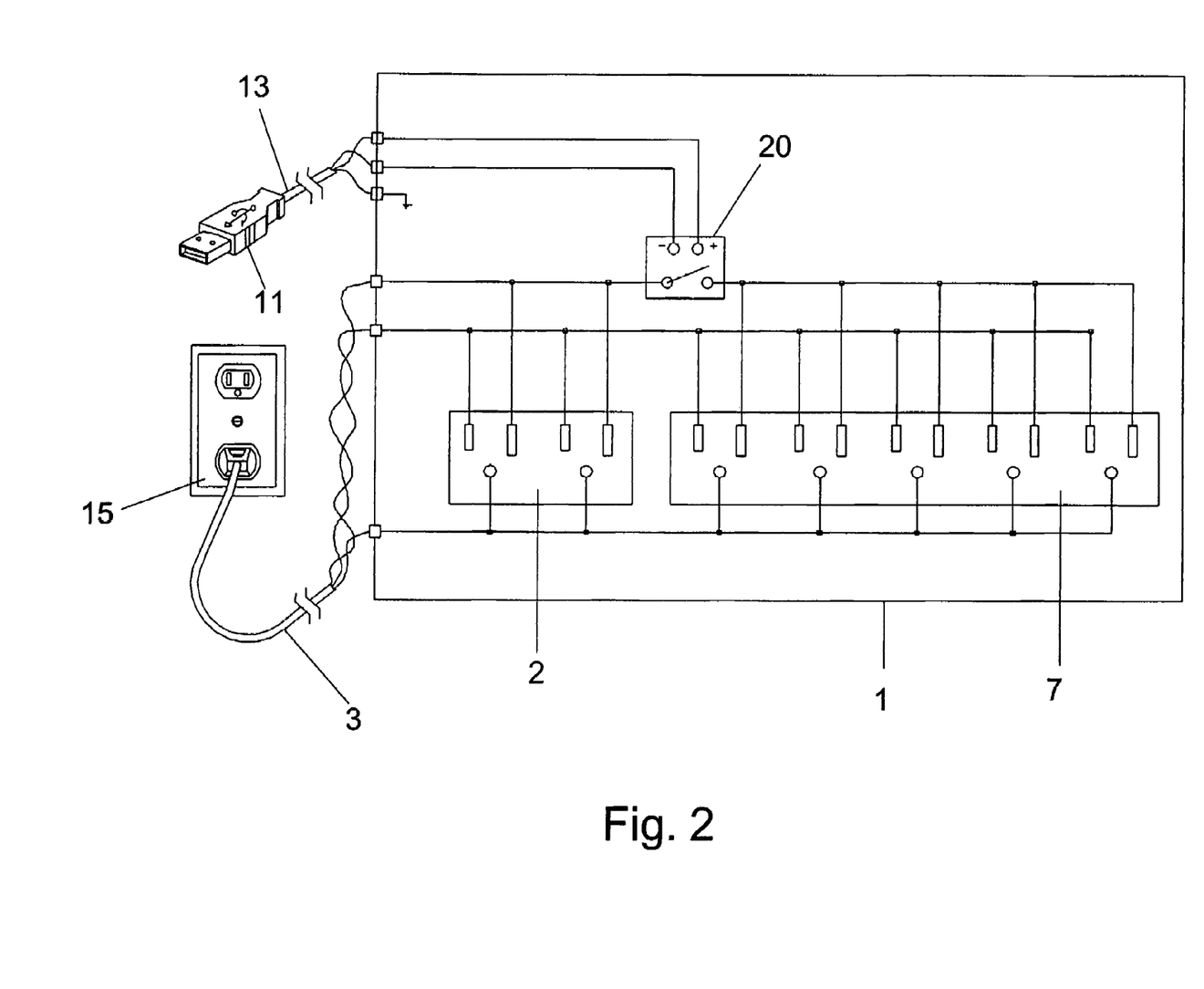
FIG. 2 is a schematic representation of the invention.

As shown in FIG. 2, in one form of the invention switches 2 are "unswitched" and switches 7 are "switched" by synchronous transfer switch or solid state relay 20, in response to the sensed presence or absence of a low voltage, e.g. 5 Volt, signal over cable 13 from USB plug 11 attached to a PC (not shown). In this way, when the master switch of the PC is manipulated to place the PC in the "ON" state, the 5 Volt power tap provided by USB plug 11 being connected into the USB port of the PC will provide a 5 Volt signal to relay 20, which in turn will cause relay 20 to complete the circuit between the AC input 15 via power cord 3 and switched outlets 7. It is to be noted that in the embodiment where there are unswitched outlets 2, they are constantly "live" since they are upstream of, and hence not affected by, the relay 20.

It is important to note that any number of unswitched and switched outlets, 2, 7, respectively, are contemplated to be within the scope of the invention. In addition, the 5 Volt power tap input may be obtained from any feature of the PC. All that is required is that a signal be received from the PC when the PC is in the "ON" state to so indicate that state to the relay 20 to cause the switched outlets 7 to be energized. And, when the PC state is turned to "OFF" the relay 20 will "sense" the absence of the 5 Volt input via cable 13, causing the relay to interrupt power supplied to the switched outlets 7, causing them to be de-energized. During all times, the unswitched outlets 2 remain energized, even when the PC state is "OFF".

It is also to be understood that any desired accessories may be provided with the power strip such as surge protection, which may be in any form such as metal oxide varistors (MOV), diodes, coils, resistors, etc.

Figure 3:
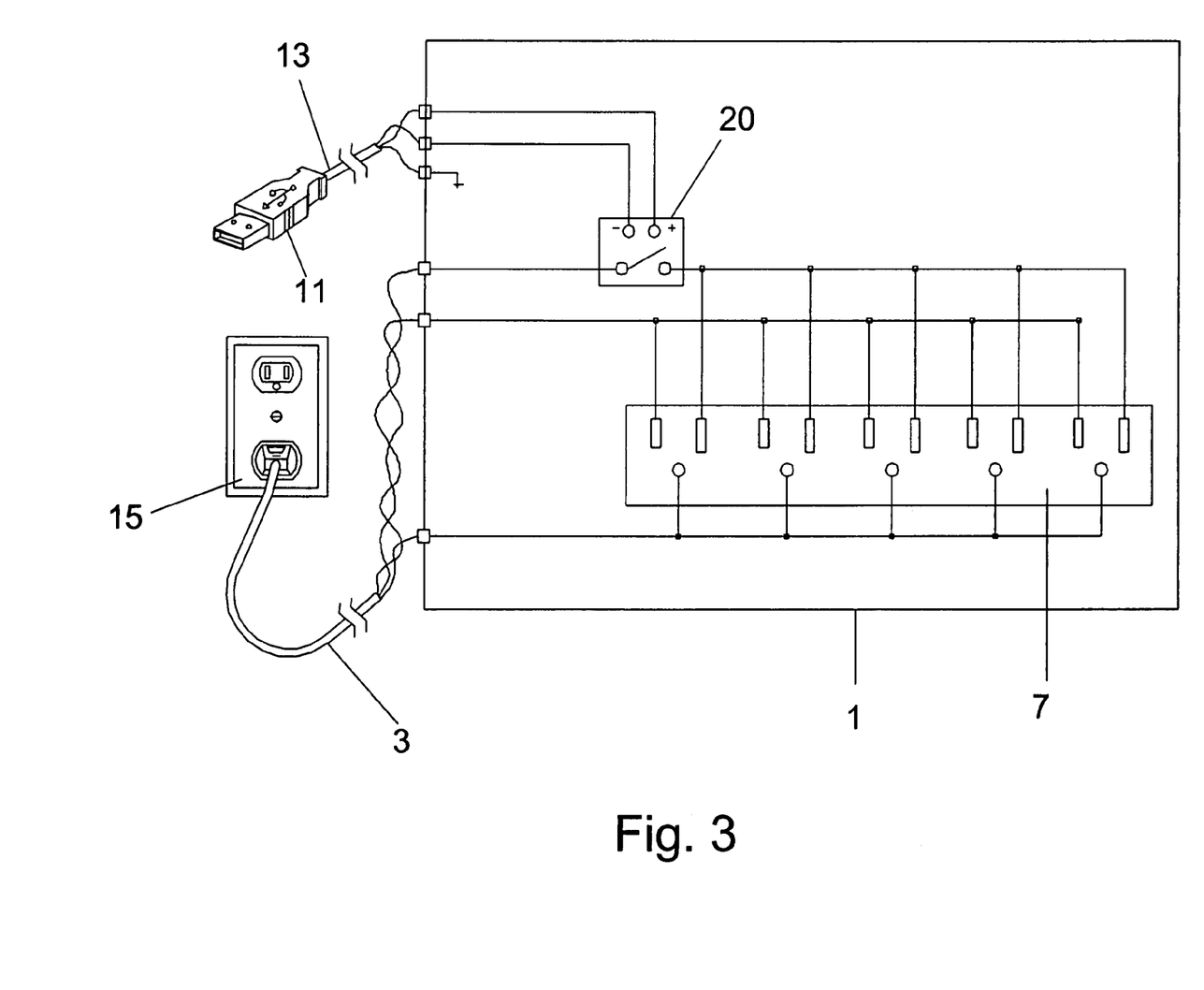
FIG. 3 is a schematic representation of an alternative embodiment of my invention.

Referring now to FIG. 3, an alternative form of the invention is shown including a power strip housing 1 directly connected to a source of power 15 via power cord 3. In this embodiment, no unswitched power outlets are provided.

Figure 4:
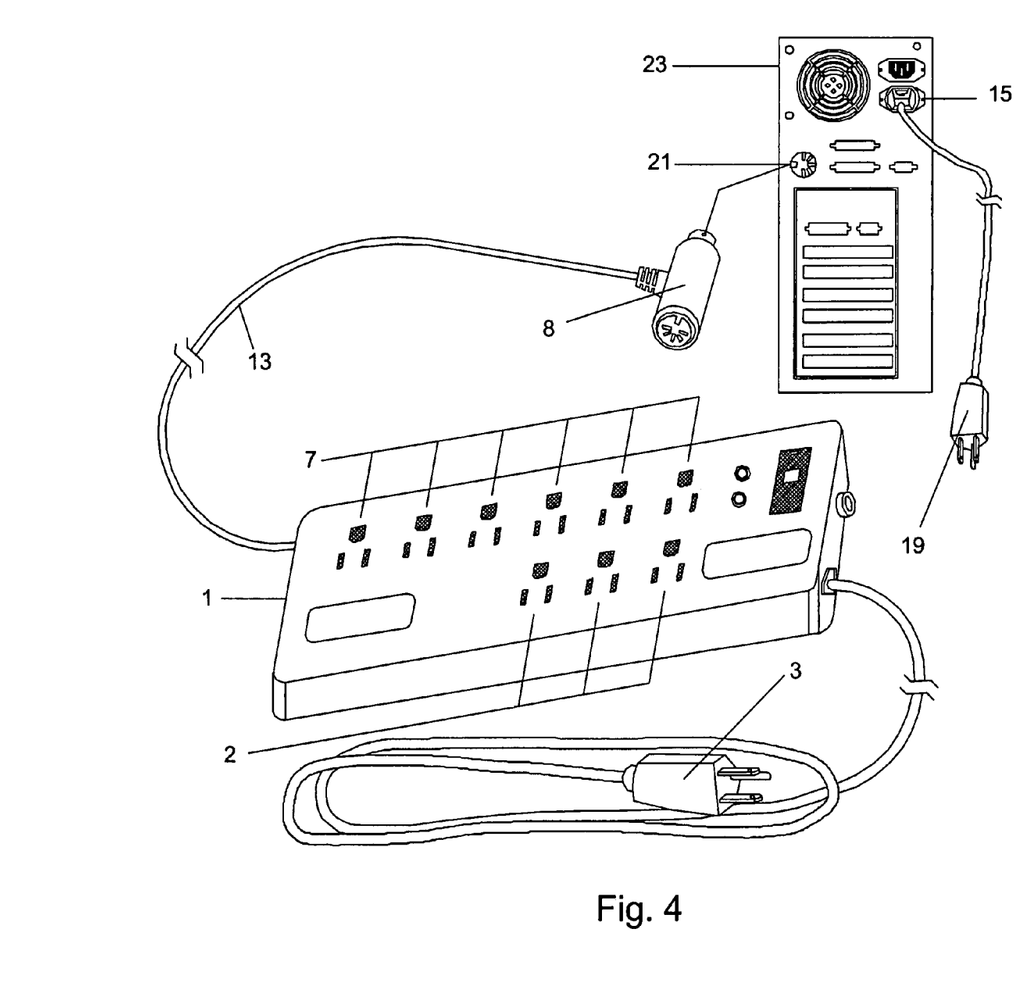
FIG. 4 is a diagramatic representation of another embodiment of my invention.

Referring now to FIG. 4, another embodiment of the invention is disclosed in which the 5 volt power tap consists only of the DIN keyboard connector 8 having male and female receptacles so that the signal to the keyboard cable DIN socket 21 associated with PC 23 can be shared both with the keyboard (not shown) and power strip 1. In the embodiment shown in FIG. 4, a PC model XT or AT is shown, but it is to be understood that any embodiment of this invention is also perfectly suitable for use with any and all personal computers presently on the market or to be introduced in the future. To employ the invention, the keyboard cable is disconnected from socket 21 on PC 23, the DIN shared adapter 8 plugged thereinto, and the keyboard DIN connector is plugged into the female side of the shared DIN connector 8. Then, the 110 volt power cable (not shown) which supplies PC 23 with power is plugged into one of the unswitched outlet 2 of housing 1.

Figure 5:
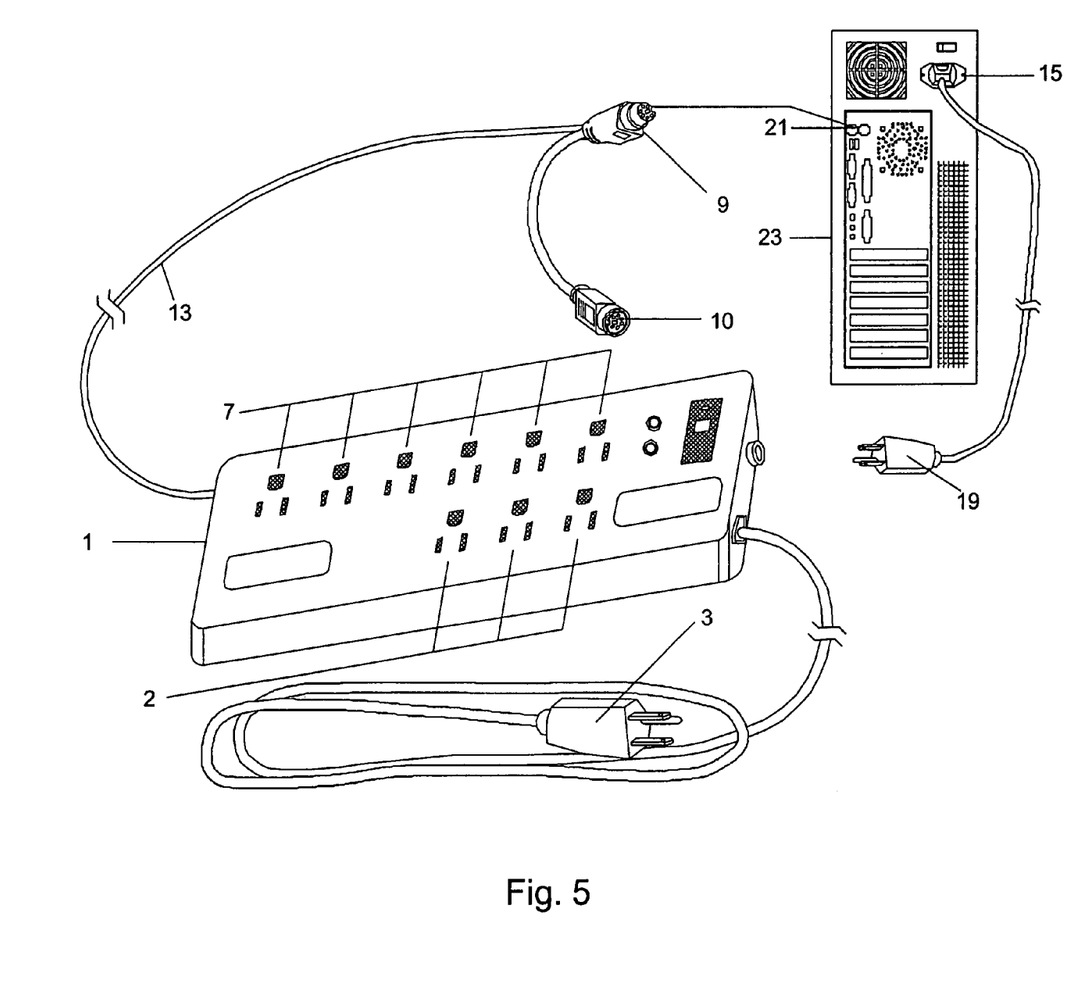
FIG. 5 is a diagramatic representation of the preferred embodiment of my invention.

FIG. 5 shows a PC cabinet 23' of the ATX variety. In this embodiment, which is the preferred embodiment, a slightly modified type of shared DIN connector is employed in the form of a pair of receptacles, first male DIN plug 9 adapted to be received by a suitable socket 21 associated with PC 23', and female DIN socket 10 adapted to receive the male plug on the keyboard or mouse cable (not shown) for that computer. Again in this embodiment, as in the embodiment in FIG. 4, the power cord 19 of PC 23' is plugged into one of the unswitched outlets 2.

It should be appreciated that the USB/type connector 11 shown in FIGS. 2 and 3 can easily be replaced by the DIN/type connectors shown in FIGS. 4 and 5. In this way, the embodiment of FIG. 5 can be practiced in the systems reflected schematically in FIGS. 2 and 3. The same holds true for the next embodiment.

Figure 6:
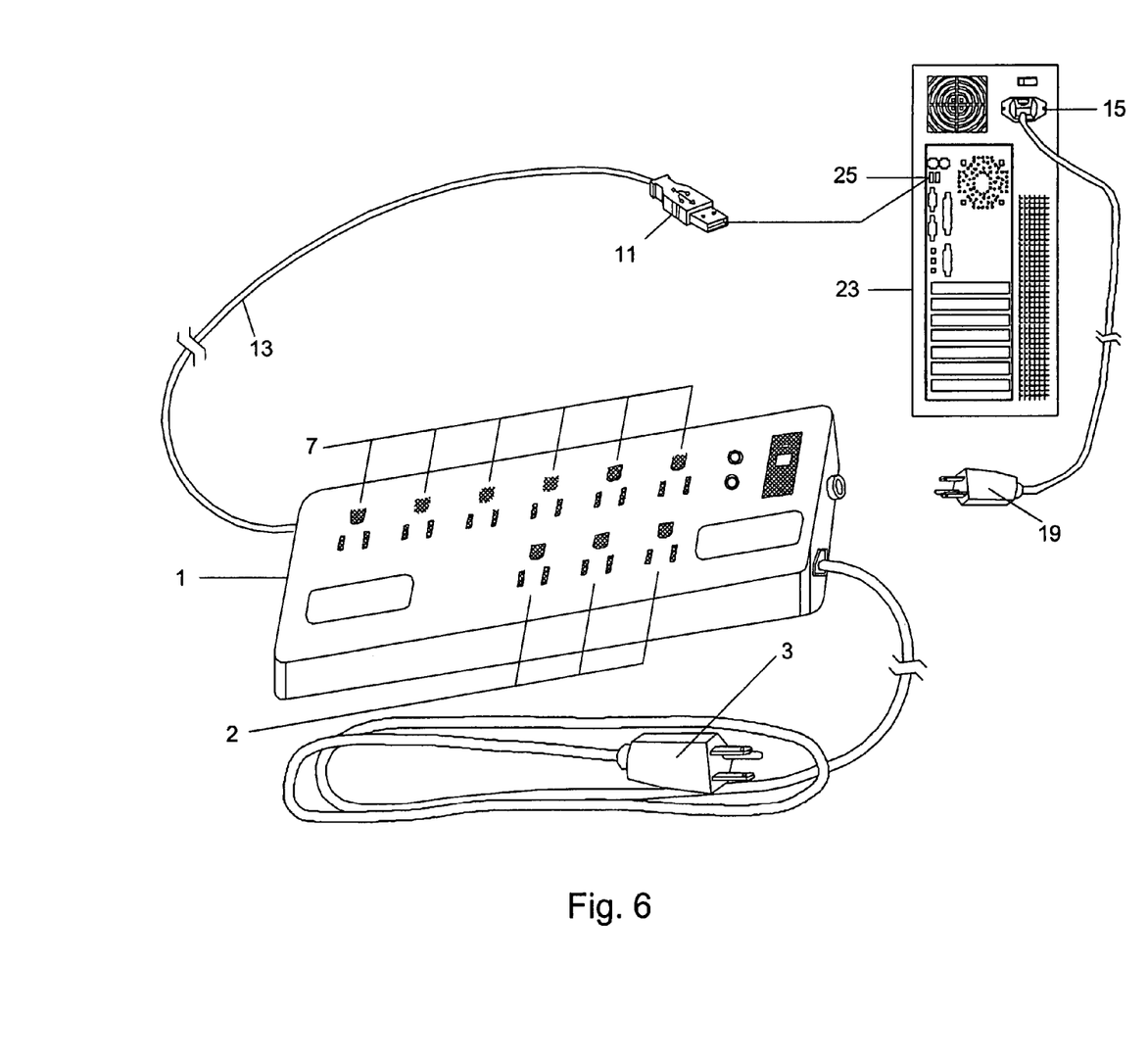
FIG. 6 is a diagramatic representation of a further embodiment of my invention.

In the embodiment shown in FIG. 6, the shared DIN plug 8 of FIG. 4, and the shared DIN plugs of FIG. 5, are replaced by a USB connector 11, which is adapted to be inserter into a corresponding socket 25 in PC 23'. Also, power cord 19 is plugged on one end into power cord receptacle 15 of PC 23', and at the other end into an unswitched outlet 2. Alternatively, a shared USB-type connector could be employed, so that a peripheral device which necessitates the use of USB connector could be plugged thereinto and still permit the invention to function as intended.

Figure 7:
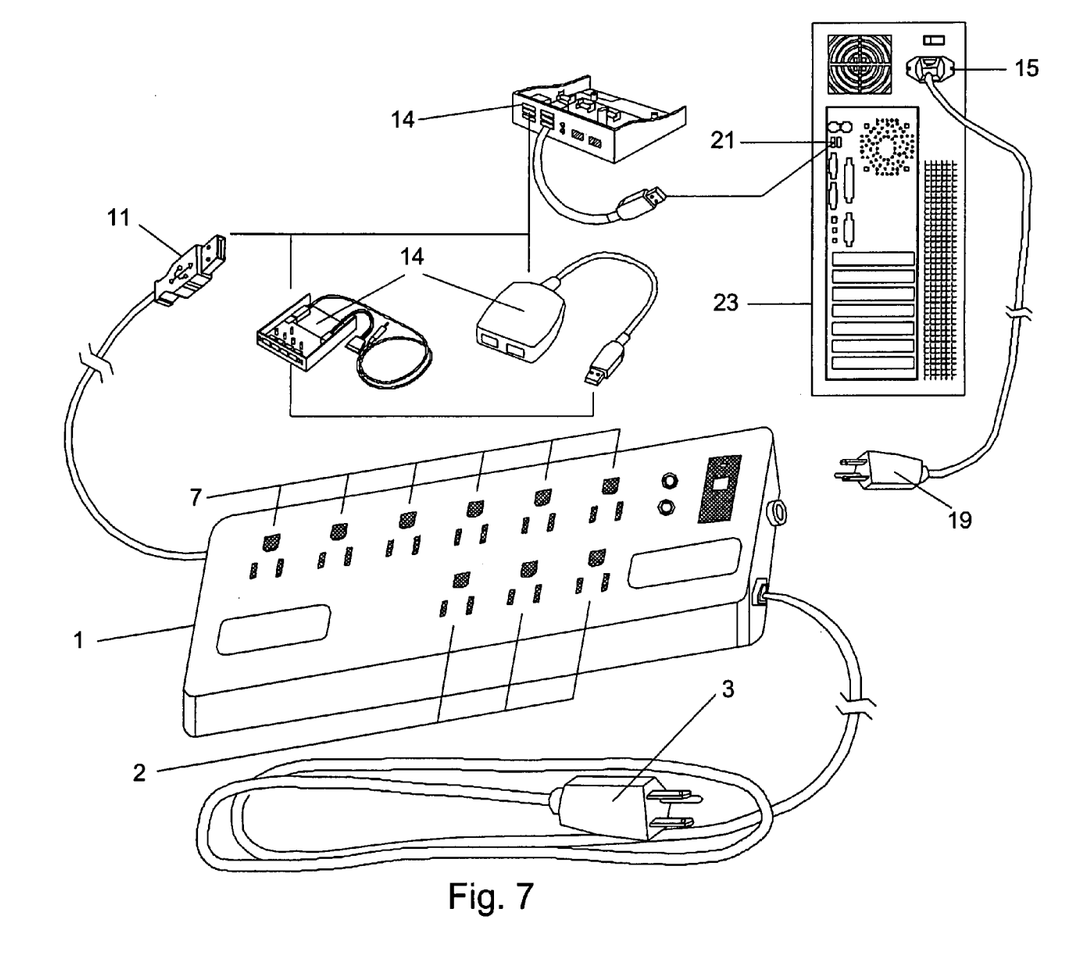
FIG. 7. is a diagramatic representation of a modified further embodiment of my invention.

As shown in the embodiment of FIG. 7, a slightly modified version of the embodiment shown in FIG. 6 is illustrated in which USB connector 11 can be plugged into any of an assortment of peripheral computer equipment 14 such as a universal serial bus hub, a front USB hub, a USB/hub splitter for notebook PCs, or any device which utilizes a type-A USB connector.

In the embodiments shown in the drawings, it will be readily apparent to one skilled in the art that, by plugging the power cord 19 of the PC into a unswitched outlet 2 on power strip 1, and further by plugging into switched outlets 7 any peripheral device which the user desires to be de-energized at the time the PC 23 or 23' is de-energized, the desired result of de-energizing outlets 7 is obtained when relay 20 senses the absence of the low voltage signal on cable 13. This result is brought about whether the manual ON/OFF switch is turned to the OFF position on the PC, or whether the automatic software shutoff feature found in Windows 95, 98 and 2000 (and other products) is utilized.

The electrical power strip device of this invention may be configured and constructed for use with any line voltage or current level. In most applications, the electrical power strip device will be configured and constructed for use in connection with a standard wall outlet voltage such as the nominal 110V and nominal 220V wall outlets found in typical American homes. Other voltages or current levels may be utilized in other countries, or in commercial or industrial applications wherein other line voltages may be necessary or desirable.

Further in accordance with the present invention, there is provided a method for causing at least one secondary device to become energized and de-energized substantially simultaneously with a primary device, through the use of the power strip device of the present invention. Broadly stated, the method is described as follows: A method for causing at least one secondary device to become energized and de-energized substantially simultaneously with a primary device, through the use of an electrical power strip device of the type having at least one unswitched and at least one switched socket, each adapted to receive a standard electrical power cord plug, means for sensing the presence of a low voltage signal from the primary device, a synchronous transfer switch connected to the means for sensing for selectively supplying or depriving electrical energy from an electrical energy source to the switched outlets upon the sensing of the presence or the absence, respectively, of the low voltage signal from the means for sensing, and a power cord electrically connected between the primary device and at least one of the unswitched outlets of the power strip, the method comprising the steps of:

connecting the power cord to one of the unswitched outlets of the power strip; and connecting at least one secondary device to the at least one switched socket;

communicating the synchronous transfer switch with a low voltage (e.g., 5 Volt) output socket associated with the primary device such that when the primary device is de-energized the synchronous transfer switch senses the absence of this low voltage signal and will therefore open to prevent current from passing to the secondary device(s) through the switched socket (s), and when the primary device is energized the synchronous transfer switch will sense the presence of the low voltage signal from the primary device and therefore close so as to permit power to pass the electrical energy source through the switched socket(s) to the secondary device (s); and wherein the means for sensing is a low voltage power tap cable.

Moreover, it is to be appreciated that the above set forth description and the accompanying drawings are directed to certain presently preferred and alternative embodiments of the invention only, and various editions, deletion and modifications may be made to the above described embodiments without departing from the intended spirit and scope of the invention. Accordingly, it is intended that any and all such editions, deletions and modifications be included within the scope of the following claims.

What is claimed is:

1. A system for automatically interrupting power to a second device upon the extinguishing of power to a first device, the first device being adapted to receive electrical energy from an external electrical energy source, the system comprising:

a power strip having at least one switched outlet adapted to receive an electrical power cord plug from the second device;

a voltage sensing device that selectively detects an operating voltage used by the first device during operation of the first device, the operating voltage being less than a voltage associated with power supplied by the external electrical energy source; and a switch, coupled to the voltage sensing device, that supplies electrical energy from the external electrical energy source to the at least one switched outlet in the event that the voltage sensing device detects the operating voltage of the first device and deprives the at least one switched outlet from receiving electrical energy from the external electrical energy source in the event that the voltage sensing device does not detect the operating voltage of the first device.

2. The system of claim 1, wherein the voltage sensing device is a 5 Volt power tap.

3. The system of claim 1, wherein the power strip further includes at least one unswitched outlet that is not supplied or deprived electrical energy by the switch.

4. The system of claim 3, wherein the first device further includes a power cord adapted to couple the external electrical energy source to the first device and wherein the power cord of the first device is adapted to be plugged into the at least one unswitched outlet of the power strip.

5. The system of claim 1, wherein the first device is a computer and wherein the voltage sensing device includes a cable that electrically connects the switch to a female DIN mouse socket of the computer.

6. The system of claim 1, wherein the first device is a computer and wherein the voltage sensing device includes a cable that electrically connects the switch to a female DIN keyboard socket of the computer.

7. The system of claim 1, wherein the first device is a computer and wherein the voltage sensing device includes a cable that electrically connects the switch to a female DIN socket associated with the computer.

8. The system of claim 1, wherein the first device is a computer and wherein the voltage sensing device includes a cable that electrically connects the switch to a USB female socket associated with the computer.

9. The system of claim 1, wherein the voltage sensing device includes a cable that electrically connects the switch to a USB female socket associated with a universal serial bus hub.

10. The system of claim 1, wherein the voltage sensing device includes a cable that electrically connects the switch to a USB female socket associated with a front USB hub.

11. The system of claim 1, wherein the first device is a notebook PC and wherein the voltage sensing device includes a cable that electrically connects the switch to a USB female socket associated with a USB/hub splitter for the notebook PC.

12. The system of claim 1, wherein the switch comprises one of a synchronous transfer switch and a relay.

13. The system of claim 1, wherein the switch supplies electrical energy from the external electrical energy source to the at least one switched outlet in the event that the voltage sensing device further supplies the detected operating voltage of the first device to the switch to facilitate operation of the switch.

14. A system for automatically interrupting power to at least one peripheral device, the system comprising:

a primary device adapted to receive electrical energy from an external electrical energy source, the primary device at least partially controlling operation of the at least one peripheral device;

a power strip having at least one switched outlet adapted to receive an electrical power cord plug from the at least one peripheral device;

a voltage sensing device that selectively detects an operating voltage used by the primary device during operation of the primary device, the operating voltage being less than a voltage associated with power supplied by the external electrical energy source; and a switch, coupled to the voltage sensing device, that supplies electrical energy from the external electrical energy source to the at least one switched outlet in the event that the voltage sensing device detects the operating voltage of the primary device and deprives the at least one switched outlet from receiving electrical energy from the external electrical energy source in the event that the voltage sensing device does not detect the operating voltage of the primary device.

15. The system of claim 14, wherein the voltage sensing device comprises a 5 Volt power tap.

16. The system of claim 14, wherein the primary device comprises a computer.

17. The system of claim 14, wherein the switch supplies electrical energy from the external electrical energy source to the at least one switched outlet in the event that the voltage sensing device further supplies the detected operating voltage of the primary device to the switch to facilitate operation of the switch.

18. An automatic power interruption system comprising:

a first device adapted to receive electrical energy from an external electrical energy source, the first device at least partially controlling operation of a second device;

a power strip having at least one switched outlet adapted to receive an electrical power cord plug from the second device;

a voltage sensing device that selectively detects an operating voltage used by the first device during operation of the first device, the operating voltage being less than a voltage associated with power supplied by the external electrical energy source; and a switch, coupled to the voltage sensing device, that supplies electrical energy from the external electrical energy source to the at least one switched outlet in the event that the voltage sensing device detects the operating voltage of the first device and deprives the at least one switched outlet from receiving electrical energy from the external electrical energy source in the event that the voltage sensing device does not detect the operating voltage of the first device.

19. The system of claim 18, wherein the voltage sensing device comprises a 5 Volt power tap.

20. The system of claim 18, wherein the switch supplies electrical energy from the external electrical energy source to the at least one switched outlet in the event that the voltage sensing device further supplies the detected operating voltage of the first device to the switch to facilitate operation of the switch.

21. A method for automatically causing at least one secondary device to become energized and de-energized by an external electrical energy source substantially simultaneously with a primary device through the use of an electrical power strip of the type having at least one switched outlet adapted to receive an electrical power cord plug, a voltage sensing device for selectively detecting an operating voltage used by the primary device during operation of the primary device, the operating voltage being less than a voltage associated with power supplied by the external electrical energy source, and a switch coupled to the voltage sensing device for selectively supplying or depriving electrical energy from the external electrical energy source to the at least one switched outlet, the method comprising:

connecting a power cord of the at least one secondary device to the at least one switched outlet; and coupling the voltage sensing device to the primary device such that when the primary device is de-energized and the voltage sensing device is not supplying any voltage to the switch, the switch will be open to prevent current from passing to the at least one secondary device, and when the primary device is energized and producing an operating voltage and the voltage sensing device is supplying the operating voltage to the switch, the switch will close so as to permit power to pass through the at least one switched outlet to the at least one secondary device.

22. A method for automatically causing a second device to become energized and de-energized by an external electrical energy source substantially simultaneously with a first device, the method comprising:

selectively detecting the presence of an operating voltage of the first device, the operating voltage being less than a voltage associated with power supplied by the external electrical energy source;

supplying electrical energy from the external electrical energy source to a switched outlet of a power strip to which a power cord of the second device is connected in the event that the operating voltage of the first device is detected; and depriving the switched outlet from receiving electrical energy from the external electrical energy source in the event that the operating voltage of the first device is not detected.

23. The method of claim 22, further comprising:

supplying the operating voltage of the first device to a switch positioned between the first device and the switched outlet to facilitate operation of the switch, wherein the electrical energy from the external electrical energy source is selectively supplied to the switched outlet through the switch.

* * * * *